US008070339B2

(12) United States Patent
Koike

(10) Patent No.: US 8,070,339 B2
(45) Date of Patent: Dec. 6, 2011

(54) VEHICLE LAMP

(75) Inventor: Teruo Koike, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 96 days.

(21) Appl. No.: 12/391,228

(22) Filed: Feb. 23, 2009

(65) Prior Publication Data

US 2009/0257240 A1 Oct. 15, 2009

(30) Foreign Application Priority Data

Feb. 22, 2008 (JP) ................................ 2008-041743

(51) Int. Cl.
*B60Q 1/04* (2006.01)

(52) U.S. Cl. .............. 362/538; 362/296.01; 362/311.02; 362/311.1; 362/507; 362/539

(58) Field of Classification Search .................. 362/539, 362/516, 538, 545, 296.01, 311, 311.1, 308, 362/293, 311.02, 327–329, 331–333, 507, 362/509, 510
See application file for complete search history.

(56) References Cited

U.S. PATENT DOCUMENTS 4,460,940 A * 7/1984 Mori ............................ 362/558
4,562,519 A 12/1985 Deves
7,244,056 B2 7/2007 Koike et al.
7,387,413 B2 * 6/2008 Brinkmann et al. .......... 362/460
7,524,094 B2 * 4/2009 Fukawa et al. ................ 362/514
7,654,714 B2 * 2/2010 Mochizuki et al. ........... 362/539
7,800,124 B2 * 9/2010 Urano et al. .................... 257/98
2006/0175626 A1 8/2006 Wall, Jr.
2006/0215415 A1 * 9/2006 Suzuki et al. ................. 362/539
2007/0086148 A1 4/2007 Schwenkschuster et al.
2007/0285939 A1 * 12/2007 Tachibana ..................... 362/509
2009/0001490 A1 1/2009 Bogner et al.
2009/0257240 A1 10/2009 Koike

FOREIGN PATENT DOCUMENTS

JP 60062001 4/1985
JP 5-50754 U 7/1993
JP 2005044574 2/2005
JP 2006-222430 A 8/2006
JP 2007-103937 A 4/2007
JP 2008-507850 A 3/2008
JP 2008226542 9/2008

* cited by examiner

*Primary Examiner* — Jong-Suk (James) Lee
*Assistant Examiner* — Stanley Weinberg
(74) *Attorney, Agent, or Firm* — Kenealy Vaidya LLP

(57) ABSTRACT

A vehicle lamp including a projector headlight using an LED light source for a low beam can include a shade, an LED light source, an ellipsoidal reflector and a projector lens. Both a focus of the projector lens and a top edge of the shade can be located near a second focus of the reflector. The LED light source can be located near a first focus located below the second focus of the reflector. Therefore, light emitted from the LED light source can be effectively gathered near the focus of the projector lens via the reflector and can be projected via the projector lens with high light use-efficiency. The projector lens can include light dispersing portions or structures on an upside and downside thereof for reducing chromatic aberration. Thus, the lamp can project a favorable light distribution that can conform to light distribution standards for vehicle headlights and the like.

12 Claims, 7 Drawing Sheets

10

10

| location | size | A | B | C | D | E | F | G | H | I |
|---|---|---|---|---|---|---|---|---|---|---|
| upside | small | ○ | ○ | ○ | | | | | | |
| | medium | | | | ○ | ○ | ○ | | | |
| | large | | | | | | | ○ | ○ | ○ |
| downside | large | | | ○ | | | ○ | | | ○ |
| | medium | | ○ | | | ○ | | | ○ | |
| | small | ○ | | | ○ | | | ○ | | |
| | |  15 15 |  15 12 |  15 9 |  12 15 |  12 12 |  12 9 |  9 15 |  9 12 |  9 9 |
| chromaticity | | | ◎ | ◎ | | | ◎ | | | ◎ |
| sample | S | A | B | C | D | E | F | G | H | I |

| | | | | | | | | | | |
|---|---|---|---|---|---|---|---|---|---|---|
| relative brightness(%) | 100% | 94% | 94% | 88% | 95% | 91% | 87% | 93% | 91% | 85% |

VEHICLE LAMP

This application claims the priority benefit under 35 U.S.C. §119 of Japanese Patent Application No. 2008-041743 filed on Feb. 22, 2008, which is hereby incorporated in its entirety by reference.

BACKGROUND

1. Field

The presently disclosed subject matter relates to a vehicle lamp including a projector headlight using an LED light source for a low beam, and more particularly to a vehicle lamp including a projector headlight having a favorable light distribution pattern that can conform to a light distribution standard for a headlight.

2. Description of the Related Art

A projector headlight for a low beam and/or a high beam is frequently incorporated into vehicle lamps, such as a headlamp, a position lamp, a turn-signal lamp, brake lamp, traffic lamp, etc. The projector headlight may allow a light-emitting area thereof to be reduced and therefore allows the vehicle lamp including the projector headlight to be minimized in comparison with other type headlights.

FIG. 7(A) is a schematic side cross-section view depicting basic structure in a conventional projector headlight, and FIG. 7(B) is a schematic diagram showing a fundamental light distribution pattern for driving on the left side of a roadway as formed by the headlight of FIG. 7(A).

According to the basic structure of the conventional projection headlight shown in FIG. 7(A), the projector headlight 80 includes: a light source 82; an elliptical reflector 83 in which a first focus thereof is located near the light source 82; a projector lens 85 which has a focus thereof located near a second focus of the elliptical reflector 83; and a shade 84 having a top edge located near the focus of the projector lens 85. Thus, an optical axis Z80 intersects substantially with an optical axis of the light source 82, both the first and second focuses of the elliptical reflector 83, the top edge of the shade 84 and the focus of the projector lens 85, respectively.

In the conventional projector headlight 80, a part of the light emitted from the light source 82 directly passes through the projector lens 85 and another part of the light indirectly passes through the projector lens 85 by reflecting on the elliptical reflector 83. In this case, because the shade 84 can shield an upward portion of the emitted light, the projector headlight 80 can form light distribution pattern P50 for a low beam as shown in FIG. 7(B). Marks VL, HL and CL80 are a vertical line, a horizontal line and a cut-off line formed by the shade 84, respectively.

In the above-described structure, the projector lens 85 is composed of a convex lens including an aspheric surface. Therefore, the light L50 that is refracted at an edge portion of the projector lens 85 may cause larger chromatic aberration than at a middle position of the projector lens 85. The chromatic aberration tends to occur near the cut-off line CL80 shown in FIG. 7(B) because the light that passes near the top edge of the shade after being reflected from the elliptical reflector 83 may be more easily gathered at the edge portion of the projector lens 85.

Thus, the above-described structure may include a problem in that the chromatic aberration causes an unclear cut-off line CL80 in the light distribution pattern P50 shown in FIG. 7(B). To help solve this problem, a projector lens has been disclosed in patent document No. 1 (Japanese Patent Application Laid Open S60-62001 which is in the same patent family as U.S. Pat. No. 4,562,519). The projector lens provides an upper and lower portion thereof with a refracting member. Therefore, the negative effect caused by the chromatic aberration may be reduced.

A shade is disclosed in patent document No. 2 (Japanese Patent Application Laid Open JP2005-044574 which is in the same patent family as U.S. Pat. No. 7,244,056). The shade is formed with relatively large thickness and extends downward in a direction towards the projector lens. Thus, the negative effect of the chromatic aberration may decrease because mixture light located at the edge portion of the projector lens can be increased.

However, LED light sources have been used as a light source for a vehicle lamp for several reasons, including because an LED chip has recently been able to provide high-power with low power consumption. In addition, LED light sources can emit various color lights including a white light that can be used for a vehicle headlight. Therefore, the LED light sources have been also used as a light source for a vehicle headlight.

When an LED light source for emitting white light is designed, the white LED light source may generally be composed of a blue LED chip and a yellow phosphor (or other wavelength conversion material). In this case, because the LED light source may include more light emission points (i.e., blue light LEDs with wavelength conversion layer(s)) as compared with a normal incandescent or other single light source bulb, the LED light source may cause a problem such as projecting blue light near the cut-off line CL80 while widely refracting light at the edge portion of the projector lens.

Therefore, a projector lens for the LED light source is disclosed in patent document No. 3 (Japanese Patent Application Laid Open JP2008-226542). The projector lens is made by integrally casting both a high refracting and dispersing resin and a low refracting and dispersing resin. Thus, the negative effect of the chromatic aberration may be decreased via the projector lens that is composed of two layer lens.

In a vehicle headlight using the LED light source, it is important for the headlight to effectively emit the light emitted from the LED light source via the projector lens with respect to light use efficiency. Consequently, the projector lens disclosed in patent document No. 1 and the shade disclosed in patent document No. 2 may not adequately solve the above-described problems in the vehicle headlight using the LED light source. The above-described conventional structure may shield many of the light emitted from the light source 82 with the shade 84 and cannot emit them forwards via the projector lens 85.

The projector lens disclosed in patent document No. 3 may be difficult to integrally cast while maintaining the accuracy thereof so as to conform a light distribution standard for a headlight. In addition, the projector lens may cause problems such that a shape thereof becomes thick, and therefore the projector may cause the projector headlight to become high cost and a decrease of the brightness.

The above-referenced Patent Documents are listed below and are hereby incorporated with their English abstracts in their entireties.

1. Patent document No. 1: Japanese Patent Application Laid Open S60-62001 and U.S. Pat. No. 4,562,519.
2. Patent document No. 2: Japanese Patent Application Laid Open JP2005-044574 and U.S. Pat. No. 7,244,056
3. Patent document No. 3: Japanese Patent Application Laid Open JP2008-226542

The disclosed subject matter has been devised to consider the above and other problems, characteristics and features. Thus, an embodiment of the disclosed subject matter can include a vehicle lamp including a projector headlight using an LED light source for a low beam that can conform to a light distribution standard for headlights with respect to white chromaticity. In this case, if the LED light source for the projector headlight is composed of a blue LED and a yellow phosphor, the projector headlight can conform to a light distribution standard while reducing a negative effect of the chromatic aberration. The light source can also be configured with the relatively simple structure.

SUMMARY

The presently disclosed subject matter has been devised in view of the above and other characteristics, desires, and problems in the conventional art, and to make certain changes to existing projector headlights. Thus, an aspect of the disclosed subject matter includes providing a projector headlight using an LED light source for a low beam that can conform to a light distribution standard for headlights with respect to white chromaticity. Another aspect of the disclosed subject matter includes providing vehicle lamps including the projector headlight using an LED light source, wherein the vehicle lamps can be used as projector headlights for a high beam and a low beam with a favorable light distribution pattern and a simple structure.

According to an aspect of the disclosed subject matter, a projector headlight can include a shade having a top edge; a circuit board having a mounting surface; an LED light source having an optical axis; at least one ellipsoidal reflector having a first focus and a second focus; and a projector lens that is a convex lens having both an optical axis and a focus located on the optical axis. The LED light source can be mounted on the mounting surface of the circuit board so that the optical axis thereof is located perpendicular to the mounting surface of which the virtual extension intersects substantially with the top edge of the shade. The ellipsoidal reflector can be configured to locate the first focus thereof substantially at the LED light source and to locate the second focus thereof substantially at the top edge of the shade.

In addition, the optical axis of the projector lens can intersect substantially with the second focus of the ellipsoidal reflector at the focus thereof and can be configured to intersect substantially with both the optical axis of the LED light source and the virtual extension of the mounting surface of the circuit board that is located below the optical axis of the projector lens. In this case, the projector lens can be configured to provide both a light dispersing portion above the optical axis thereof and a light dispersing portion below the optical axis thereof.

In the above-described exemplary projector headlight, an intersecting angle between the optical axis of the projector lens and the virtual extension of the mounting surface of the circuit board can be 45 degrees or less. The LED light source can be composed of at least one blue chip and a yellow phosphor. Moreover, the light dispersing portion formed below the optical axis of the projector lens can be larger than the dispersing portion formed above the optical axis of the projector lens.

According to the above-described exemplary projector headlight, the light emitted from the LED light source can be effectively reflected on the reflector towards the second focus of the reflector that is located near the focus of the projector lens and therefore the light use efficiency of the LED light source can improve. In addition, the light dispersing portion formed on the downside of the projector lens can be configured to be larger than the light dispersing portion formed on the upside. Thus, the different light dispersing portions can result in solving the problem of the chromatic aberration while maintaining the high light use efficiency.

In this case, both light dispersing portions can be integrally casted into the projector lens with a transparent thermoplastic, or via other known manner such as attachment of a light dispersion structure. The projector lens can be attached to a casing that includes the shade therein. In addition, a heat sink can be provided in the projector headlight in order to radiate heat generated from the LED light source while fixing the circuit board. The ellipsoidal reflector can be attached to the casing using one end thereof so as to contact another end thereof with the circuit board and/or the heat sink.

In the above-described exemplary projector headlight, the shade can be integrally cast into the casing, in which the ellipsoidal reflector can be attached. In addition, the projector lens including both light dispersing portions integrated therein can be attached to the casing. Thus, the projector headlight can become a simple structure while easily maintaining a necessary accuracy.

According to another aspect of the disclosed subject matter, a vehicle lamp including the projector headlight can further include a housing, a headlight for a high beam attached to the housing; and an outer lens located adjacent the housing. In this case, the headlight for a high beam can be configured with a projector headlight using an LED light source In the above-described vehicle lamp including the projector headlight, the vehicle lamp can include a headlight for a high beam and other lamp such as a position lamp and the like because the projector headlight can be designed to fit in a small space. When the vehicle lamp is composed of the projector headlight(s) using LED light source(s) for both a high beam and a low beam, the vehicle lamp can provide a favorable light distribution with nearly the same color tone between a high beam and a low beam.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
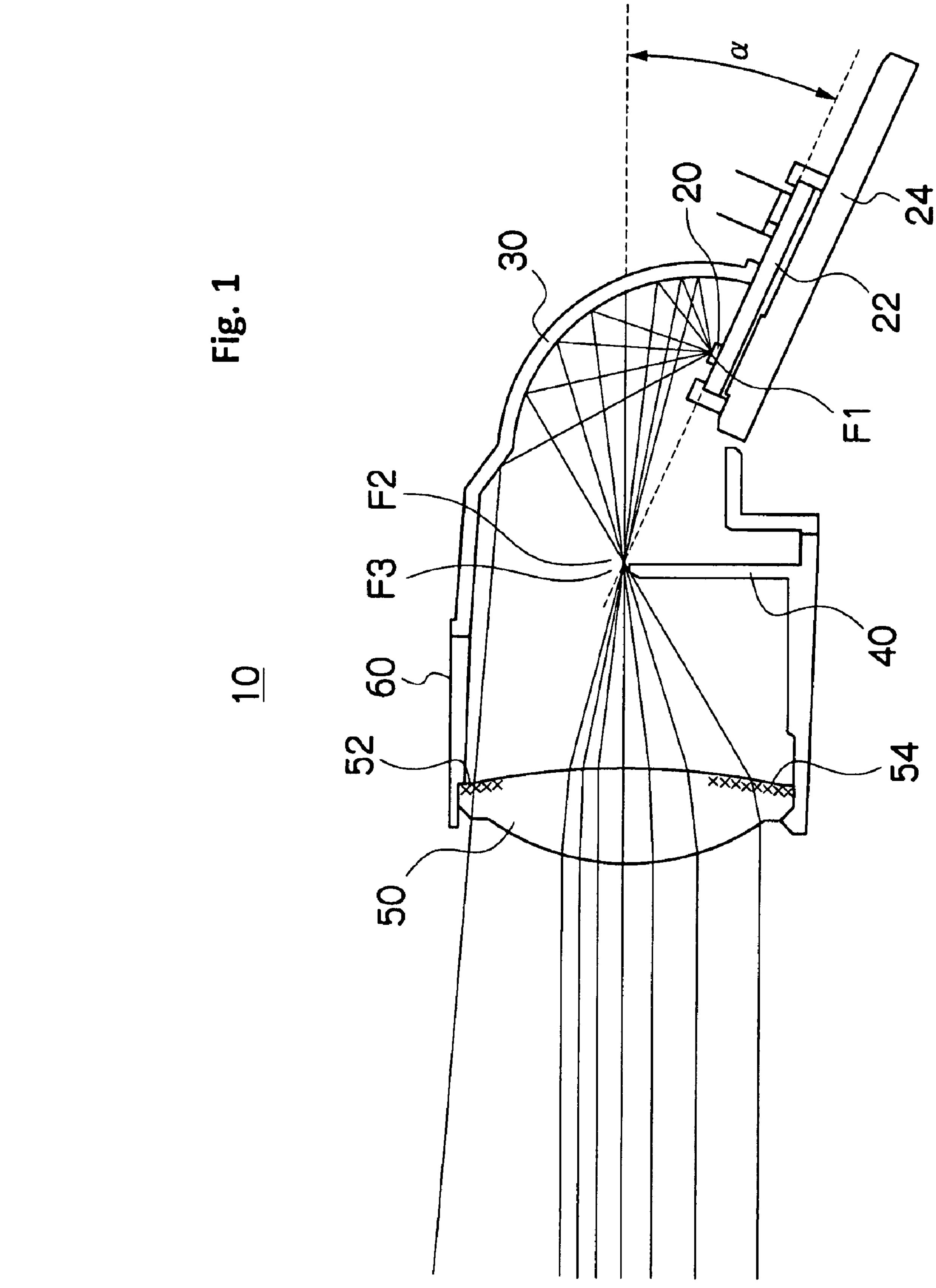
FIG. 1 is a schematic cross-section view showing an exemplary embodiment of a projector headlight for low beam made in accordance with principles of the disclosed subject matter.

The disclosed subject matter will now be described in detail with reference to FIGS. 1 to 6. FIG. 1 is a schematic cross-section view showing an exemplary embodiment of a low beam projector headlight made in accordance with principles of the disclosed subject matter.

The projector headlight 10 can include: an LED light source 20; a reflector 30 for reflecting light emitted from the LED light source 20; a shade 40 for shielding a part of the light reflected by the reflector 30; a projector lens 50 for projecting a light that is not shielded with the shade 40, where the projector lens 50 is composed of a convex lens having an optical axis and a focus F3 located on the optical axis; and a casing 60 for holding the projector lens 50.

The LED light source 20 can include at least one LED chip and can emit white light using a wavelength-conversion material. For example, the LED light source 20 can be composed of a blue LED chip and a yellow phosphor as the wavelength-conversion material. The yellow phosphor can be mixed with a transparent resin such as an epoxy resin, a silicone resin, etc.

The blue LED chip can be encapsulated with the transparent resin including the yellow phosphor. In this case, the yellow phosphor can convert blue light emitted from the blue LED chip into a yellow light, and the blue light of the blue LED chip can then be converted into white light via a yellow/blue color mixture.

However, the LED light source 20 can also be composed of a red LED chip, a green LED chip and a blue LED chip without using the wavelength-conversion material. In this case, the LED light source 20 may emit white light via a red/green/blue color mixture without use of the wavelength-conversion material and can also emit white light of which chromaticity can be adjusted by a wavelength-conversion material.

The LED light source 20 can be mounted on a mounting surface of a circuit board 22 so that an optical axis thereof is located perpendicular to the mounting surface of the circuit board 22. The circuit board 22 can be attached to a heat sink 24 so that the optical axis of the LED light source 20 intersects substantially with the optical axis of the projector lens 50. The heat sink 24 can be made of a metallic plate and can radiate heat generated from the LED light source 20.

The circuit board 22 can be configured to decline (or reside at an angle with respect to the optical axis of the projector lens) in a direction opposed to and away from the projector lens 50. The projector lens 50 can have a focus F3 that intersects with a virtual extension of the mounting surface of the circuit board 22. The angle $\alpha$ between a virtual extension of the mounting surface of the circuit board 22 and the optical axis of the projector lens 50 can be configured within a predetermined range of 45 degrees or less at the focus F3 located on the optical axis of the projector lens 50. In other words, the two dimensional surface upon which and at which the LED light source is mounted is located within a plane, and the plane intersects the focus F3 of the projector lens 50 and is oriented at an angle $\alpha$ with respect to the optical axis of the projector lens.

Thus, a substantially right triangle can be configured with the optical axis of the projector lens 50, the mounting surface including the virtual extension of the circuit board 22 and the optical axis of the LED light source 20. Two sides of the right triangle can be the mounting surface including the virtual extension of the circuit board 22 and the optical axis of the LED light source 20.

The reflector 30 can be configured with at least one ellipsoidal reflex surface, and a first focus F1 thereof can be located near the LED light source 20 and a second focus F2 thereof can be located near the focus F3 of the projector lens 50. The reflector 30 can be located over a major linear axis passing through both the focus F1 and F2. The linear axis can be configured to decline within the predetermined range of 45 degrees or less with respect to the optical axis of the projector lens 50. The reflector 30 can also be located above the LED light source 20. Thus, the reflector 30 can be formed as a half round having an opening for passing the reflected light towards a front view thereof.

In this case, the reflector 30 can be attached to the casing 60 using one end thereof and another end thereof can connect with the circuit board 22 and/or the heat sink. The structure of the reflector 30 can result in increasing the light use efficiency of the light source 20. If the above-described angle is more than 45 degrees, the reflector 30 may require an additional reflector and/or the shape may be made larger in order to maintain the light use efficiency.

When the projector headlight 10 is used in low beam mode using the above-described structure, the projector headlight 10 can include shade 40 in order to shield an upward light that may give a glaring type of light to an oncoming car and the like. A top edge of the shade 40 can be located at or near the second focus F2 of the reflector 30 in order to form a horizontal cut-off line for an oncoming lane and a driving lane. The shade 40 can be integrated into the casing 60 that holds the projector lens 50.

The projector lens 50 can be held by the casing 60 in which focus F3 and F2 are located. The projector lens 50 can be formed as a flat surface on an incoming surface thereof and can be formed as a convex surface for a convex lens on an outgoing surface thereof. Both surfaces can also be formed as convex surfaces for a convex lens, including an aspheric lens.

The projector lens 50 can include both a light dispersing portion 52 above the optical axis thereof and a light dispersing portion 54 below the optical axis thereof. The light dispersing portion 54 can be larger than the light dispersing portion 52. The reason will be described in detail later. The light dispersing portions 52 and 54 can be formed as a texturing, a fine prism and a grating, or other known dispersing structure, and can be formed on at least one of the incoming surface and the outgoing surface of the projector lens 50. The light dispersing portions 52 and 54 can also be formed as a texturing and the like on both the incoming surface and the outgoing surface in some cases.

The light dispersing portions 52 and 54 can respectively be attached to the projector 50 as attachment members, and also can be integrally cast into the projector lens 50. The integrated projector lens 50 can result in a reduction of manufacturing processes/time for the projector headlight 10 because a separate attachment process is not required.

In the projector headlight 10 configured for use as a low beam, an amount of light projected from the downside (lower half) of the projector lens 50 can become greater than an amount of light projected from the upside (upper half) thereof. Thus, when the light dispersing portion 54 formed on the downside of the projector lens 50 is 20 percent or more in terms of area than the light dispersing portion 52 formed on the upside thereof, the negative effect of the chromatic aberration may be adequately reduced via the light dispersing portions 52 and 54.

The projector headlight 10 using the LED light source 20 can enable the projector lens 50 to be cast using a transparent thermoplastic because the LED light source 20 does not transmit substantial heat toward the projector lens 50 in comparison with the conventional light source that is composed of a bulb. The transparent thermoplastic can include various materials, including a polycarbonate resin, a metacrylate resin, a cycloolefin resin, and other similar materials which can be used to form the projector lens 50. The thermoplastic can facilitate the casting of the projector lens 50 in various shapes and therefore the light dispersing portions 52 and 54 can be easily integrated into the projector lens 50.

Specific operations of the projector headlight 10 will now be given in more detail with reference to FIGS. 1 and 2. The LED light source 20 can be located near the first focus F1 of the reflector 30. Accordingly, the light emitted from the LED light source 20 can be reflected from the reflector 30 and the reflected light can gather near the second focus F2 of the reflector 30.

In this case, the LED light source 20 can be located opposite the projector lens 50 and oriented on a substantially planar mounting surface that declines within a predetermined range of 45 degrees or less with respect to the optical axis of the projector lens 50 (which planar surface can either extend to or virtually extend within the same plane to the focus F3 of the projector lens 50). The virtual extension of the mounting surface can intersect with the focus F3 of the projector lens 50. In other words, a central optical axis of the LED light source can intersect the optical axis of the projector lens at an angle of 45 degrees or more. The reflector 30 can also be located opposite the projector lens 50 so as to decline within a predetermined range of 45 degrees or less to the optical axis of the projector lens 50 while the other end thereof is located on or below at least the mounting surface of the circuit board 22.

The reflector 30 can be formed long in a direction towards the major axis thereof and the optical axis of the LED light source 20 can be located perpendicular to the major axis thereof. Thus, because the light emitted from the LED light source 20 can be effectively reflected on the reflector 30 towards the second focus of the reflector 30 that is located near the focus F3 of the projector lens 50, the light use efficiency of the LED light source 20 can improve.

A part of the light gathered near the second focus F2 of the reflector 30 can be shielded by the top edge of the shade 40 and another portion of the light can be emitted through the projector lens 50 forward. However, because the light shielded by the shade 40 can become small in the structure of the disclosed subject matter, the projector headlight 10 can emit a large amount of light via the projector lens 50 with high light use efficiency.

Figure 2:
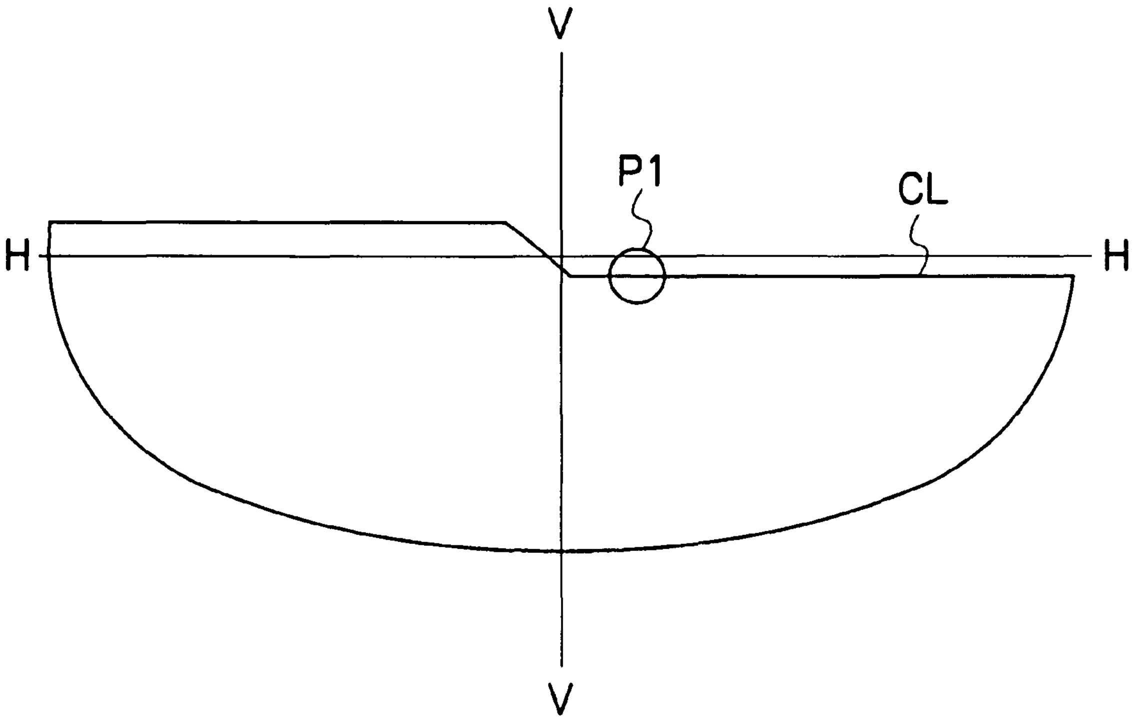
FIG. 2 is a schematic diagram showing a fundamental light distribution pattern for driving on the left side formed by the projector headlight shown in FIG. 1.

FIG. 2 is a schematic diagram showing a fundamental light distribution pattern for driving on the left side formed by the projector headlight 10 shown in FIG. 1, wherein marks V, H and CL shown in FIG. 2 are a vertical line, a horizontal line and a cut-off line, respectively. The projector headlight 10 can form the light distribution pattern including the cut-off line CL for a low beam. Mark P1 of FIG. 2 will be described later.

Figure 7A:
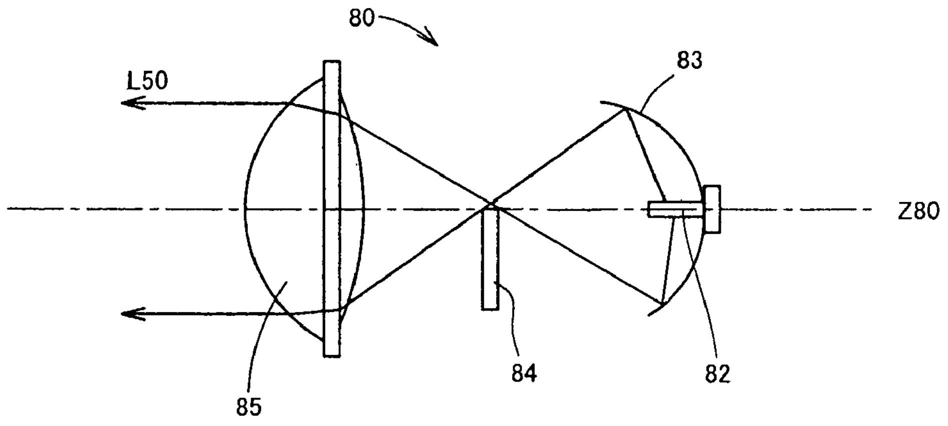
Fig. 7(a) Conventional Art
FIG. 7(A) is a schematic side cross-section view depicting a basic structure in a conventional projector headlight and FIG. 7(B) is a schematic diagram showing a fundamental light distribution pattern for driving on the left side formed by the headlight of FIG. 7(A).
Figure 7B:
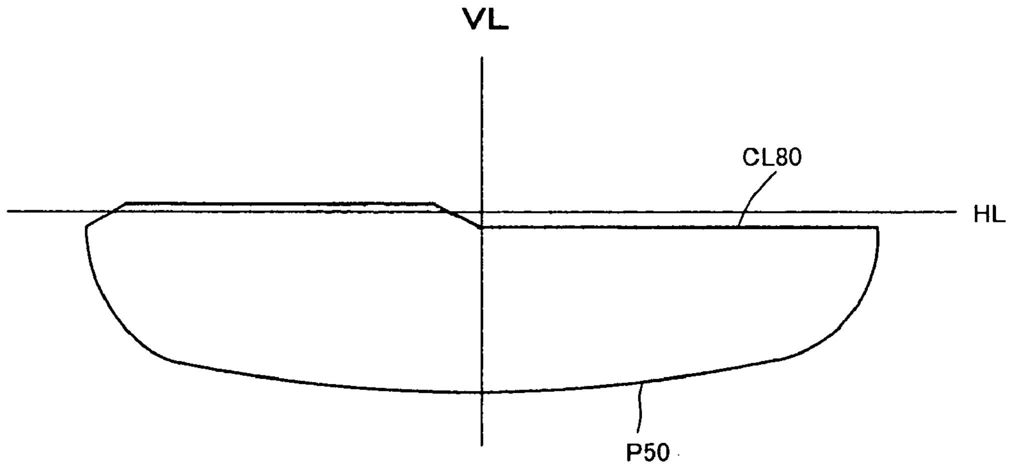
Fig. 7(b) Conventional Art

In the conventional structure of the projector headlight shown in FIG. 7(A), when the shade 84 is located between the projector lens 85 and the reflector 83, much of the light reflected from the reflector 83 may pass through a portion of the projector lens 85 lower than the optical axis Z80 of the projector lens 85. In this case, if the light source 82 is composed of a blue LED chip and yellow phosphor, the blue light having a light of short wavelength may be widely refracted. Therefore, the blue light may cause a blue color to appear near the cut-off line CL80 in the light distribution pattern P50 shown in FIG. 7(B) due to a dispersing phenomenon of the chromatic aberration.

According to the disclosed subject matter, the LED light source 20 can be located opposite the projector lens 50 so as to decline within the predetermined range of 45 degrees or less to the optical axis of the projector lens 50 while the optical axis of the projector lens 50 intersects with the virtual extension of the mounting surface thereof at the focus F3 of the projector lens 50.

Thus, because light emitted from the LED light source 20 can be first emitted toward the reflector 30 and the light can then be reflected by the reflector 30, an amount of light that passes through the upper portion above the optical axis of the projector lens 50 can be increased in spite of the shade 40 that is located in a direction towards the projector lens 50.

The light emitted from the upper portion of the projector lens 50 can also be refracted by the projector lens 50. However, because the dispersing phenomenon of the chromatic aberration may not be likely to occur in light passing near the middle of the projector lens 50, the projector headlight 10 can be prevented from emitting such blue color light that occurs in the conventional projector headlight and can thus form a light distribution pattern with white light that can conform to a light distribution standard.

Of the light portions passing through the both light dispersing portions 52 and 54 of the projector lens 50, because these light portions can be dispersed by both light dispersing portions 52 and 54, the lights is prevented from including light having a color affected by the chromatic aberration near the cut-off line CL shown in FIG. 2. Thus, the projector headlight 10 can provide a favorable light distribution that can conform to a light distribution standard for headlights.

However, the light dispersing portions 52 and 54 may cause a decrease of the light-emitting efficiency for the projector headlight 10 because dispersing portions 52 and 54 may absorb some portion of light therein. Therefore, the light dispersing portion 54 formed on the downside of the projector lens 50 can be configured to be larger than the light dispersing portion 52 formed on the upside because the light passing through the light dispersing portion 52 may be smaller in area and impact than that passing through the light dispersing portion 54. The different light dispersing portions 52 and 54 can prevent a decrease of the light use efficiency and can also result in solving the problem of chromatic aberration.

Results of an exemplary experiment using the projector headlight 10 shown in FIG. 1 will now be described with reference to FIGS. 3 and 4. The slant angle α between the virtual extension of the mounting surface of the circuit board 22 and the optical axis of the projector lens 50 is 20 degrees. The projector lens 50 is casted with poly methyl methacrylate resin (PMMA) and both light dispersing portions 52 and 54 are formed as a texturing structure on the incoming surface thereof.

Maximum value of difference between concavity and convexity Rmax, average height of convexity Ra and diameter r of both light dispersing portions 52 and 54 are shown in the following table, wherein data are measured by a surface analyzer.

| Maximum value of difference between concavity and convexity (Rmax) | Average height of convexity (Ra) | Diameter (r) |
|---|---|---|
| 1.0740 μm | 0.0612 μm | 0.1 μm |

Figure 3:
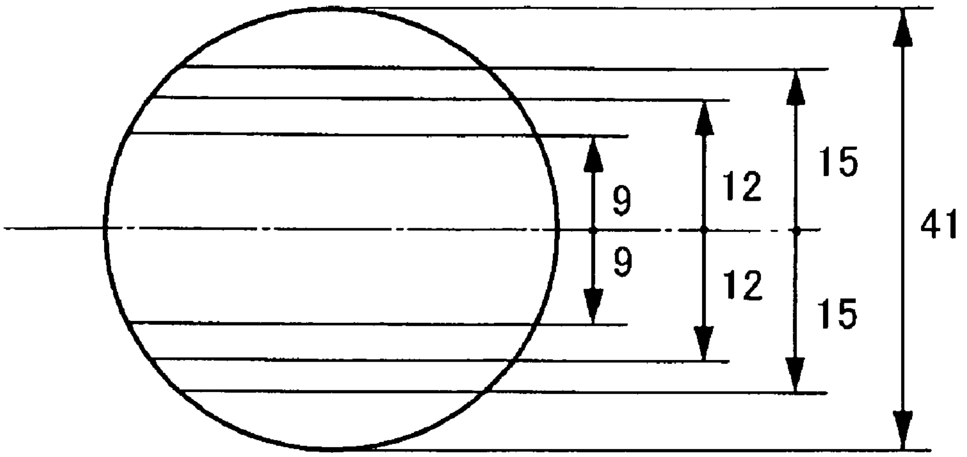
FIG. 3 is an explanatory diagram showing exemplary areas of a light dispersing portion formed on a projector lens in accordance with principles of the disclosed subject matter.

FIG. 3 is an explanatory diagram showing exemplary areas of a light dispersing portion formed on a projector lens in accordance with principles of the disclosed subject matter. The light dispersing portions 52 and 54 are respectively formed in three areas as shown in FIG. 3, wherein the incoming surface of the projector lens 50 is 41 millimeter in diameter. The numeric values are shown as a distance (in millimeters) between a horizontal line intersecting with a center (the optical axis) of the projector lens 50 and each end of both light dispersing portions 52 and 54. Therefore, when the numeric value is small, the light dispersing portion becomes large. Conversely, when the numeric value is large, the light dispersing portion becomes small.

Figure 4:
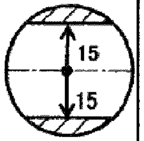
FIG. 4 is a table showing results of an exemplary experiment using the projector headlight shown in FIG. 1.
Figure 4:
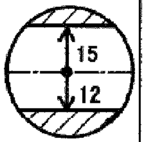
Figure 4:
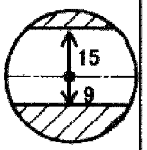
Figure 4:
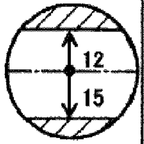
Figure 4:
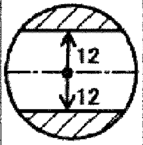
Figure 4:
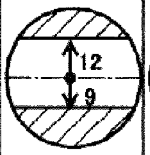
Figure 4:
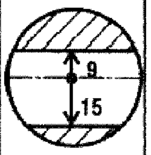
Figure 4:
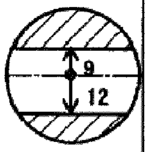
Figure 4:
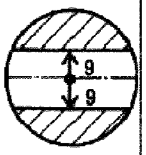

FIG. 4 is a table showing results of an exemplary experiment using the projector headlight 10 shown in FIG. 1. The table shows a chromaticity and a relative brightness with respect to ten samples, wherein sample S is not formed with light dispersing portions 52 and 54 on the projector lens 50. Samples A to I are formed with both light dispersing portions 52 and 54 as shown in FIG. 4, respectively.

The samples A, B and C are respectively formed with the same small area light dispersing portion 52 on the upside of the projector lens 50 and are formed with a small area, a medium area and a large area as the light dispersing portion 54 on the downside of the projector lens 50, respectively.

The samples D, E and F are respectively formed with the same medium area light dispersing portion 52 on the upside of the projector lens 50 and are formed with a small area, a medium area and a large area as the light dispersing portion 54 on the downside of the projector lens 50, respectively.

The samples G, H and I are respectively formed with the same large area light dispersing portion 52 on the upside of the projector lens 50 and are formed with a small area, a medium area and a large area as the light dispersing portion 54 on the downside of the projector lens 50, respectively.

Figure 5:
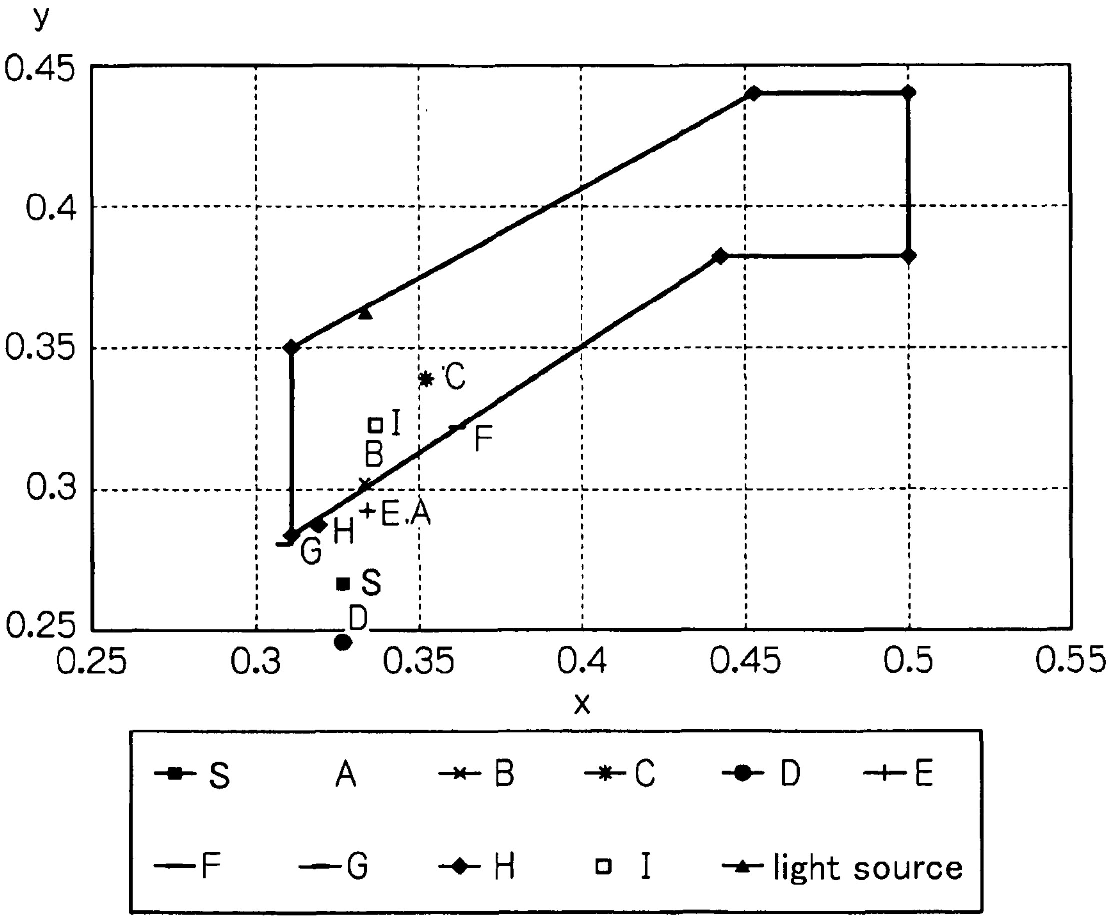
FIG. 5 is a chromaticity diagram showing chromatic results of the exemplary experiment in accordance with the table of FIG. 4.

FIG. 5 is a chromaticity diagram showing chromatic results of the exemplary experiment in accordance with the table of FIG. 4. Each of the measuring points is located at the point shown as mark P1 in FIG. 2 positioned near the cut-off line CL. An area enclosed in full lines shown in FIG. 5 shows the chromatic area for a headlight that can conform to a light distribution standard. A small triangle point shown in FIG. 5 plots a point of chromaticity in accordance with the light source 20, of which chromaticity can conform to the light distribution standard.

The samples that can conform to the light distribution standard located within the area in full lines are B, C, F and I, which are denoted by double circles in the chromaticity section of FIG. 4. These samples B, C, F and I include a large area or a medium area as the light dispersing portion 54 on the downside of the incoming surface of the projector lens 50. Each of these light dispersing portions 54 is equal to, or larger than, each light dispersing portion 52 that is formed on the upside of the incoming surface of the projector lens 50.

Other samples A, D, E, G and H are not located within the area shown in full lines of FIG. 5 and therefore cannot conform to the light distribution standard. Samples A, D, E, G and H include a small area or a medium area as the light dispersing portion 54 on the downside of the incoming surface of the projector lens 50. IN this case, each of the light dispersing portions 54 is equal to, or smaller than, each light dispersing portion 52 that is formed on the upside of the incoming surface of the projector lens 50.

In each point P1 projected from the above-described samples, blue light emitted from a respective light source 20 may slightly leak or occur near each measuring point P1 in the respective light distribution patterns. This is especially true because light sources 20 are composed of respective blue LEDs and yellow phosphors. Thus, each portion of blue light emitted from the downside of a respective projector lens 50 may appear near each cut-off line in their respective light distribution patterns.

When the brightness of sample S is 100%, each relative brightness of samples B, C, F, and I is 94%, 88%, 87% and 85%, respectively. When the light dispersing portion 54 is larger than the light dispersing portion 52 and the total area of both light dispersing portions 52 and 54 is smaller, the relative brightness becomes high. FIG. 4 shows that the brightest sample is sample B that provides the small area as the light dispersing portion 52 and the medium area as the light dispersing portion 54 with the projector lens 50. The worst sample is sample I that includes a large area for both light dispersing portions 52 and 54 with the projector lens 50.

Thus, when the light dispersing portion 54 can be formed larger than the light dispersing portion 52 and the total area of the both light dispersing portions 52 and 54 can be formed small, the projector headlight 10 can provide a favorable light distribution pattern with high brightness that can conform to a light distribution standard for headlights.

Figure 6A:
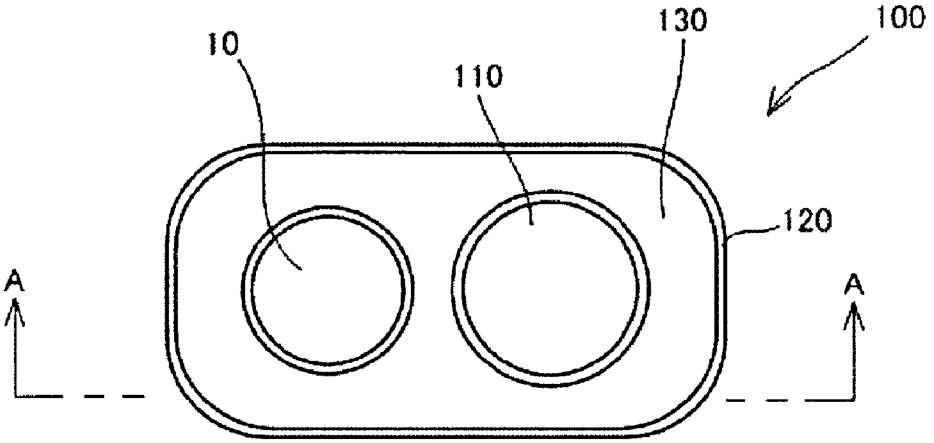
FIGS. 6(A) and (B) are respectively a schematic front view and a cross-section view depicting an exemplary embodiment of a vehicle lamp including the projector headlight in accordance with principles of the disclosed subject matter.
Figure 6B:
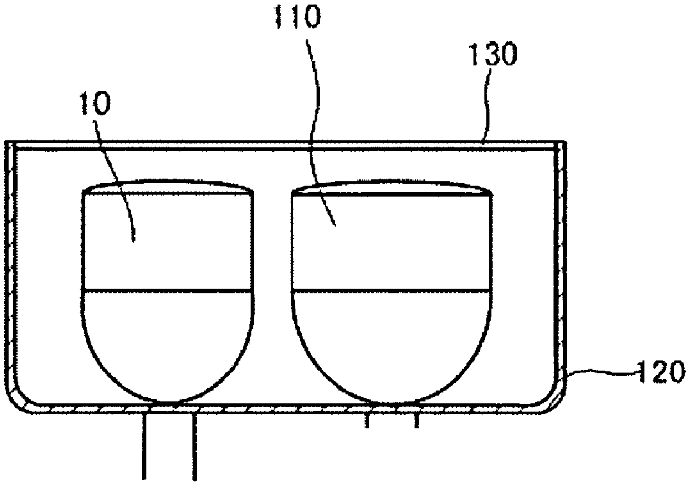

A description of a vehicle lamp including the projector headlight 10 will now be given with reference to FIGS. 6(A) and (B). FIGS. 6(A) and (B) are respectively a schematic front view and a cross-section view depicting an exemplary embodiment of a vehicle lamp including a projector headlight made in accordance with principles of the disclosed subject matter. The vehicle lamp 100 can include the projector headlight 10 for a low beam and a headlight 110 for a high beam in a housing 120.

The vehicle lamp 100 can include an outer lens 130 that is located adjacent the housing 120. The outer lens 130 can be composed of a transparent material such as an acrylic resin, etc. The outer lens 130 and housing 120 can protect both the low beam projector headlights 10 and the high beam headlight 110 from dirt and dust and the like.

The high beam headlight 110 can be composed of a projector headlight using a bulb light source and can also be composed of a projector headlight using an LED light source as well as the projector headlight 10. In this case, when the shade 40 is illuminated in the structure of the projector headlight 10 shown in FIG. 1, the projector headlight using an LED light source for a high beam can be basically constructed.

When the vehicle lamp 100 is constructed of the projector headlights using the LED light sources for both a high beam and a low beam, the size of the vehicle lamp 100 can be minimized and the lamp can require less power. In addition, the vehicle lamp 100 can provide a favorable light distribution with nearly the same color tone between a high beam and a low beam.

The vehicle lamp 100 can include other lamps such as a position lamp, a turn signal lamp and the like in the housing 120, especially because the projector headlight only requires a small space.

Thus, the disclosed subject matter can provide an excellent vehicle lamp including a projector headlight using an LED light source for a low beam or high beam with a favorable light distribution pattern.

Various modifications of the above disclosed embodiments can be made without departing from the spirit and scope of the presently disclosed subject matter. For example a headlight for a low beam can be structured by a plurality of small projector headlights using the above-described structure, which have respective different light distribution patterns.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A projector headlight, comprising:

a shade having a top edge;

a circuit board having a mounting surface and a virtual substantially co-planar extension of the mounting surface substantially intersecting with the top edge of the shade;

an LED light source mounted on the mounting surface of the circuit board and having an optical axis extending substantially perpendicular to the mounting surface of the circuit board, and the LED light source including at least one LED chip and a phosphor, wherein the shade extends below the virtual substantially co-planar extension of the mounting surface from the top edge of the shade without extending above the virtual substantially co-planar extension of the mounting surface;

at least one ellipsoidal reflector having a first focus and a second focus, the first focus located substantially at the LED light source, and the second focus located substantially at the top edge of the shade; and a projector lens configured as a convex lens having both a lens optical axis and a focus located on the lens optical axis, the projector lens configured to face the shade, and the lens optical axis substantially intersecting with the second focus of the at least one ellipsoidal reflector at the focus of the projector lens and substantially intersecting with both the optical axis of the LED light source and the virtual substantially co-planar extension of the mounting surface of the circuit board located below the lens optical axis, wherein the projector lens includes a first light dispersing surface portion structure located above the lens optical axis and a second light dispersing surface portion structure located below the lens optical axis and a light transmission surface located between the first light dispersing surface portion structure and the second light dispersing surface portion structure, wherein the first light dispersing surface portion structure and second light dispersing surface portion structure disperse light to a different degree as compared to the light transmission surface when light from the LED light source transmits therethrough, and a total area of the second light dispersing surface portion structure is larger than a total area of the first light dispersing surface portion structure.

2. The projector headlight according to claim 1, wherein an intersecting angle between the lens optical axis and the virtual substantially co-planar extension of the mounting surface of the circuit board is 45 degrees or less.

3. The projector headlight according to claim 2, wherein both the first and second light dispersing surface portion structures are integrally cast into the projector lens and the projector lens includes a transparent thermoplastic material.

4. A vehicle lamp including the projector headlight according to claim 2, further comprising:

a housing;

a headlight for a high beam attached to the housing; and an outer lens located adjacent the housing.

5. The vehicle lamp according to claim 4, wherein the headlight for a high beam includes a projector headlight using an LED light source.

6. The projector headlight according to claim 1, wherein both the first and second light dispersing surface portion structures are integrally cast into the projector lens and the projector lens includes a transparent thermoplastic material.

7. A projector headlight, comprising:

a casing including a shade having a top edge;

a heat sink;

a circuit board having a mounting surface located adjacent the heat sink, wherein a virtual substantially co-planar extension of the mounting surface substantially intersects with the top edge of the shade;

an LED light source located adjacent the mounting surface of the circuit board, the LED light source including at least one blue LED chip and a yellow phosphor and further including an optical axis extending substantially perpendicularly with respect to the mounting surface of the circuit board, wherein the shade extends below the virtual substantially co-planar extension of the mounting surface from the top edge of the shade without extending above the virtual substantially co-planar extension of the mounting surface;

at least one ellipsoidal reflector having a first focus and a second focus, one end of the reflector attached to the casing and another end of the reflector located adjacent the circuit board, the first focus of the reflector being located substantially at the LED light source, and the second focus of the reflector being located substantially at the top edge of the shade; and a projector lens configured as a convex lens having a lens optical axis and a focus located on the lens optical axis, the projector lens configured with a convex surface facing the shade, and the lens optical axis substantially intersecting with both the second focus of the at least one ellipsoidal reflector at the focus of the projector lens and the optical axis of the LED light source, the lens optical axis intersecting at an angle of substantially 45 degrees or less with the virtual substantially co-planar extension of the mounting surface of the circuit board located below the lens optical axis, wherein the projector lens includes both a smaller light dispersing portion located above the lens optical axis and a relatively larger light dispersing portion located below the lens optical axis, the larger light dispersing portion being larger in total area than a total area of the smaller light dispersing portion located above the lens optical axis.

8. The projector headlight according to claim 7, wherein the smaller and larger light dispersing portions are integrally cast into the projector lens with a transparent thermoplastic and the projector lens is attached to the casing.

9. A vehicle lamp including the projector headlight according to claim 8, further comprising:

a housing;

a headlight for a high beam attached to the housing; and an outer lens located adjacent the housing.

10. The vehicle lamp according to claim 9, wherein the headlight for a high beam includes a projector headlight using an LED light source.

11. A projector headlight, comprising:

a shade having a top edge;

a circuit board having a mounting surface and a virtual substantially co-planar extension of the mounting surface substantially intersecting with the top edge of the shade to define an intersection portion;

an LED light source mounted on the mounting surface of the circuit board and having an optical axis extending substantially perpendicular to the mounting surface of the circuit board, wherein the shade is located entirely below the virtual substantially co-planar extension of the mounting surface, except for the intersection portion, and the shade is configured such that the shade does not extend above the virtual substantially co-planar extension of the mounting surface;

at least one ellipsoidal reflector having a first focus and a second focus, the first focus located substantially at the LED light source, and the second focus located substantially at the top edge of the shade; and a projector lens configured as a convex lens having a lens optical axis, a focus located on the lens optical axis, one of a planar surface and a convex surface facing the shade, and the lens optical axis substantially intersecting with the second focus of the at least one ellipsoidal reflector at the focus of the projector lens and substantially intersecting with both the optical axis of the LED light source and the virtual substantially co-planar extension of the mounting surface of the circuit board located below the lens optical axis, wherein the projector lens includes a first light dispersing surface portion structure located above the lens optical axis and a second light dispersing surface portion structure located below the lens optical axis and a light transmission surface located between the first light dispersing surface portion structure and the second light dispersing surface portion structure, wherein the first light dispersing surface portion structure and second light dispersing surface portion structure disperse light to a different degree as compared to the light transmission surface when light from the LED light source transmits therethrough, and a total area of the second light dispersing surface portion structure is larger than a total area of the first light dispersing surface portion structure.

12. The projector headlight according to 11, wherein the second light dispersing surface portion structure is 20 percent or more in terms of area than the first light dispersing surface portion structure.

* * * * *